United States Patent
Hotta et al.

(10) Patent No.: US 8,627,743 B2
(45) Date of Patent: Jan. 14, 2014

(54) PEDAL APPARATUS FOR VEHICLE AND MANUFACTURING METHOD THEREOF

(75) Inventors: Keisuke Hotta, Anjo (JP); Tetsuo Hariu, Hekinan (JP)

(73) Assignee: Denso Corporation, Kariya (JP)

( * ) Notice: Subject to any disclaimer, the term of this patent is extended or adjusted under 35 U.S.C. 154(b) by 204 days.

(21) Appl. No.: 13/153,875

(22) Filed: Jun. 6, 2011

(65) Prior Publication Data

US 2011/0296946 A1 Dec. 8, 2011

(30) Foreign Application Priority Data

Jun. 7, 2010 (JP) .................................. 2010-129692

(51) Int. Cl.
*G05G 1/30* (2008.04)
*B60K 26/02* (2006.01)

(52) U.S. Cl.
CPC . *G05G 1/30* (2013.01); *B60K 26/02* (2013.01)
USPC ................. 74/560; 74/512; 74/513; 74/514

(58) Field of Classification Search
USPC .......................................... 74/512–514, 560
See application file for complete search history.

(56) References Cited

U.S. PATENT DOCUMENTS

| 3,734,594 | A | * | 5/1973 | Trambarulo | 385/70 |
| 4,746,231 | A | * | 5/1988 | Hoshino | 384/537 |
| 4,944,269 | A | * | 7/1990 | Imoehl | 123/399 |
| 5,588,338 | A | * | 12/1996 | Carr et al. | 74/560 |
| 5,722,148 | A | | 3/1998 | Uemoto et al. | |
| 6,305,240 | B1 | * | 10/2001 | Hannewald et al. | 74/513 |
| 6,470,768 | B2 | * | 10/2002 | Kato et al. | 74/513 |
| 6,547,533 | B2 | * | 4/2003 | Ota et al. | 417/222.2 |
| 6,564,672 | B2 | * | 5/2003 | Brock et al. | 74/512 |
| 6,880,427 | B2 | * | 4/2005 | Allen et al. | 74/512 |
| 2004/0052661 | A1 | * | 3/2004 | Seo | 417/415 |
| 2005/0241431 | A1 | * | 11/2005 | Jakobi et al. | 74/512 |
| 2009/0183589 | A1 | * | 7/2009 | Watanabe et al. | 74/513 |

FOREIGN PATENT DOCUMENTS

| JP | 1-127464 | 5/1989 |
| JP | 7-267159 | 10/1995 |
| JP | 10-959 | 1/1998 |
| JP | 2007-253824 | 10/2007 |
| JP | 2009-166804 | 7/2009 |

* cited by examiner

*Primary Examiner* — Richard W Ridley
*Assistant Examiner* — William Santosa
(74) *Attorney, Agent, or Firm* — Nixon & Vanderhye, P.C.

(57) ABSTRACT

A distal end portion of a pedal rod is press-fitted into a press-fitting hole, which is formed in a rotatable member. An intermediate portion of the pedal rod extends from and is bent relative to the distal end portion. The intermediate portion is received in a guide groove, which is formed in the rotatable member. An elongated portion of the pedal rod extends from the intermediate portion in a direction opposite from the distal end portion. A pad is provided to an end part of the elongated portion, which is opposite from the intermediate portion, and is adapted to receive a pedal force from a driver of a vehicle. The rotatable member includes a receiving hole that is adapted to receive a jig therethrough to enable the jig to contact the intermediate portion at time of press-fitting the distal end portion into the press-fitting hole.

5 Claims, 17 Drawing Sheets

PEDAL APPARATUS FOR VEHICLE AND MANUFACTURING METHOD THEREOF

CROSS REFERENCE TO RELATED APPLICATION

This application is based on and incorporates herein by reference Japanese Patent Application No. 2010-129692 filed on Jun. 7, 2010.

BACKGROUND OF THE INVENTION

1. Field of the Invention

The present invention relates to a pedal apparatus for a vehicle and a manufacturing method thereof.

2. Description of Related Art

It is known to provide a pedal apparatus that controls an operational state of a vehicle based on a force (hereinafter referred to as a pedal force), which is applied from a foot of a driver of the vehicle to a pedal.

For instance, Japanese Unexamined Patent Publication No. 2007-253824A teaches a pedal apparatus shown in FIG. 23, in which a distal end portion 6 of a pedal rod 5 is press-fitted into a press-fitting hole 4 of a rotatable member 3, which is rotatably supported by a support member 2. Furthermore, Japanese Unexamined Patent Publication No. 2009-166804A teaches a pedal apparatus 100 shown in FIG. 22, in which a distal end portion 240 of a pedal rod 200 is press-fitted into a press-fitting hole 310 of a rotatable member 300, which is rotatably supported by a support member 500. An intermediate portion 230 of the pedal rod 200 extends from and is bent relative to the distal end portion 240 into a L-shape. The intermediate portion 230 is fitted into a guide groove 320 of the rotatable member 300.

Referring back to FIG. 23, in the pedal apparatus of Japanese Unexamined
Patent Publication No. 2007-253824A, the pedal rod 5 is bent at the distal end portion 6, so that it is difficult to press-fit the distal end portion 6 into the press-fitting hole 4 of the rotatable member 3. Therefore, at the time of press-fitting the distal end portion 6 into the press-fitting hole 4, when a central axis of the distal end portion 6 is tilted relative to a central axis of the press-fitting hole 4 of the rotatable member 3, an inner wall of the press-fitting hole 4 of the rotatable member 3 may possibly be damaged by the pedal rod 5 to cause generation of a burr.

In contrast, in the pedal apparatus 100 of Japanese Unexamined Patent Publication No. 2009-166804A shown in FIG. 22, the intermediate portion 230 of the pedal rod 200 extends to the outside of the rotatable member 300. Therefore, at the time of press-fitting the distal end portion 240 into the press-fitting hole 310 of the rotatable member 300, a jig may be used to support a part of the intermediate portion 230, which extends outward from the rotatable member 300, to limit the tilting of the distal end portion 240.

However, in the case where the intermediate portion 230 extends to the outside of the rotatable member 300, a degree of design freedom with respect to a shape of an elongated portion 210, which extends from the intermediate portion 230 to the pad 250, is limited. Therefore, in the case where the pedal apparatus 100 and a brake pedal apparatus 110 of Japanese Unexamined Patent Publication No. 2009-166804A are installed in the vehicle, a distance L1 between the elongated portion 210 of the pedal apparatus 100 and a pad 111 of the brake pedal apparatus 110 may possibly become small. In such a case, at the time of depressing the pad 111 of the brake pedal apparatus 110, the foot of the driver may possibly contact the pedal rod 200 of the pedal apparatus 100 to cause interference.

SUMMARY OF THE INVENTION

The present invention addresses the above disadvantages. According to the present invention, there is provided a pedal apparatus for a vehicle, including a support member, a rotatable member, a pedal rod and a pad. The support member is adapted to be installed to the vehicle. The rotatable member is rotatably supported by the support member. The pedal rod includes a distal end portion, an intermediate portion and an elongated portion. The distal end portion is press-fitted into a press-fitting hole, which is formed in the rotatable member. The intermediate portion extends from and is bent relative to the distal end portion. The intermediate portion is received in a guide groove, which is formed in the rotatable member. The elongated portion extends from the intermediate portion in a direction opposite from the distal end portion. The pad is provided to an end part of the elongated portion, which is opposite from the intermediate portion, and is adapted to receive a pedal force from a driver of the vehicle. The rotatable member includes a receiving hole that is adapted to receive a jig therethrough to enable the jig to contact the intermediate portion at time of press-fitting the distal end portion into the press-fitting hole.

According to the present invention, there is also provided a manufacturing method of the pedal apparatus. According to the method, the pedal rod is placed on a base. Then, the jig is inserted through the receiving hole of the rotatable member such that the intermediate portion of the pedal rod is supported by the jig and the base. Thereafter, the distal end portion of the pedal rod is press-fitted into the press-fitting hole of the rotatable member in a state where the intermediate portion is supported by the jig and the base.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Embodiments of the present invention will be described with reference to the accompanying drawings.

First Embodiment

A pedal apparatus according to a first embodiment of the present invention will be described with reference to FIGS. 1 to 13.

The pedal apparatus 10 is installed in a vehicle (e.g., an automobile) and controls a driving state of the vehicle in response to the amount of depression of a pad 25, which is depressed by a foot of a driver of the vehicle. The pedal apparatus 10 of the present embodiment is a drive-by-wire type. At the pedal apparatus 10, a rotational angle of a rotatable member 30, which is rotated together with the pad 25, is sensed, and a signal, which indicates the sensed rotational angle of the rotatable member 30, is outputted to an electronic control unit (ECU) of the vehicle. Then, the ECU controls a throttle apparatus based on the sensed rotational angle of the rotatable member 30.

Figure 1:
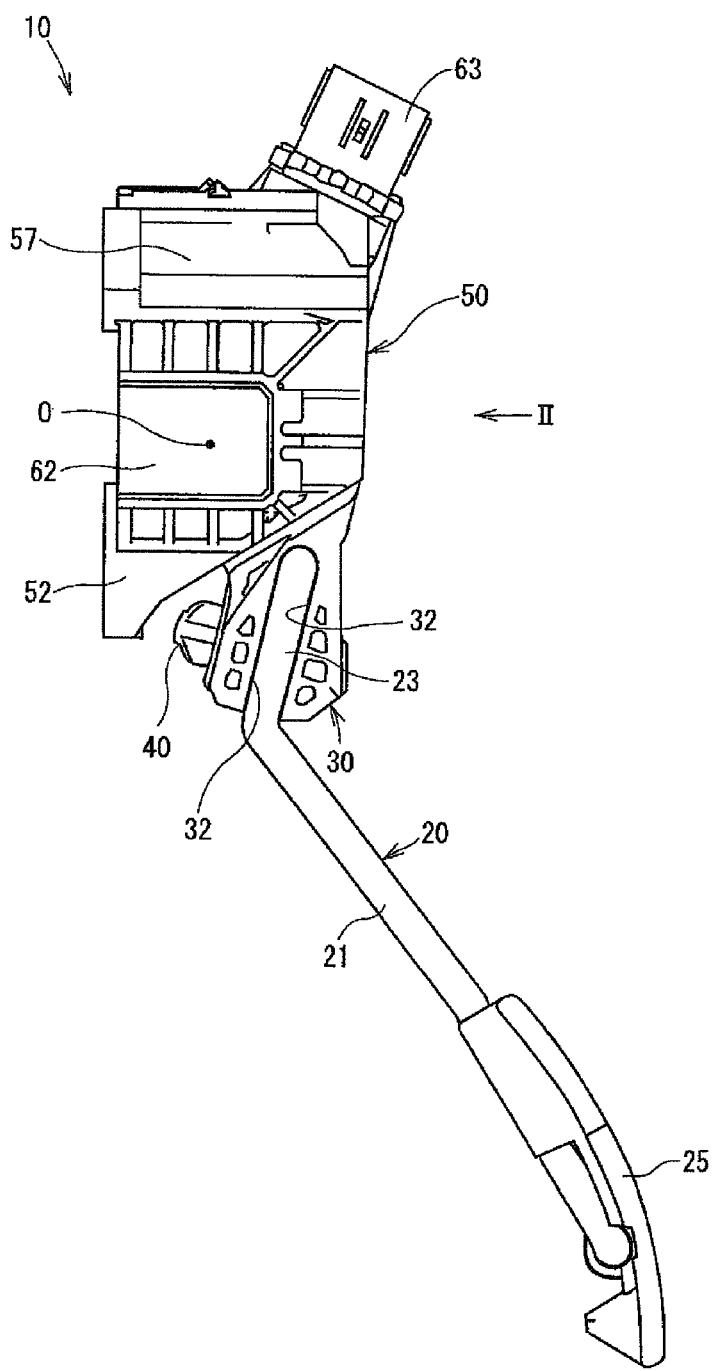
FIG. 1 is a side view of a pedal apparatus according to a first embodiment of the present invention.
Figure 2:
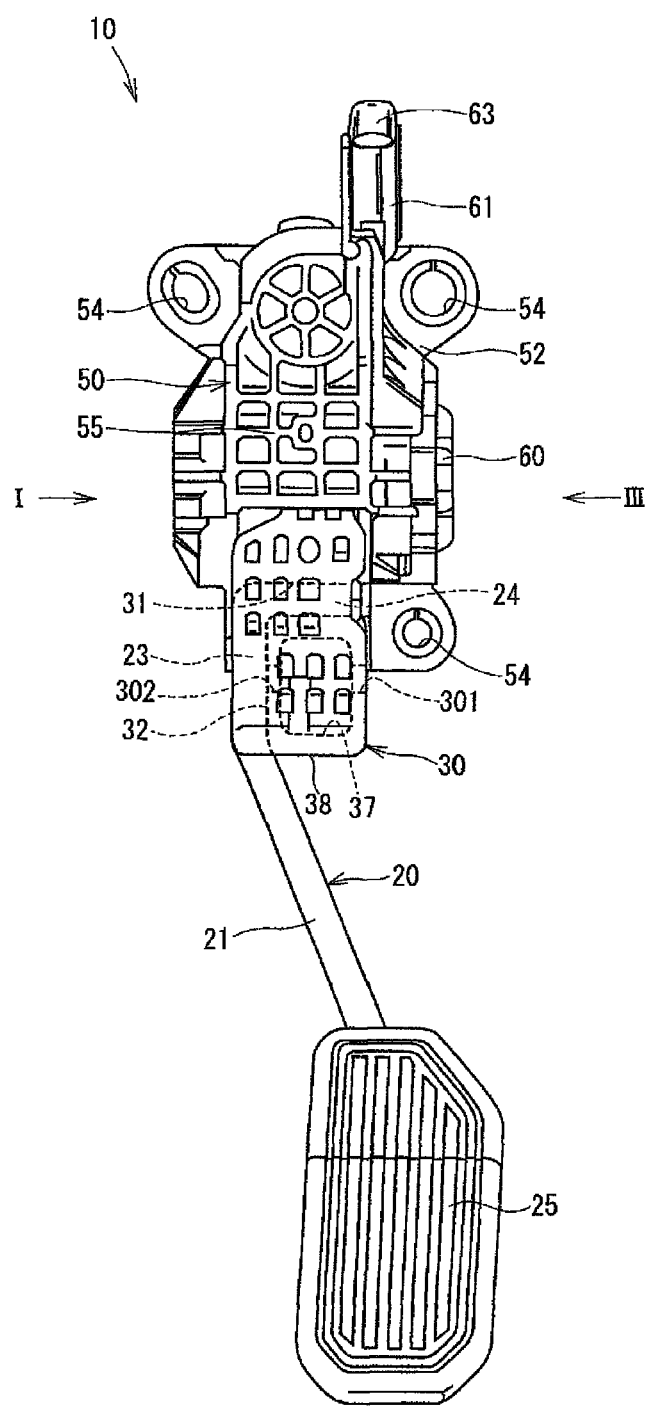
FIG. 2 is a view taken in a direction of an arrow II in FIG. 1.
Figure 3:
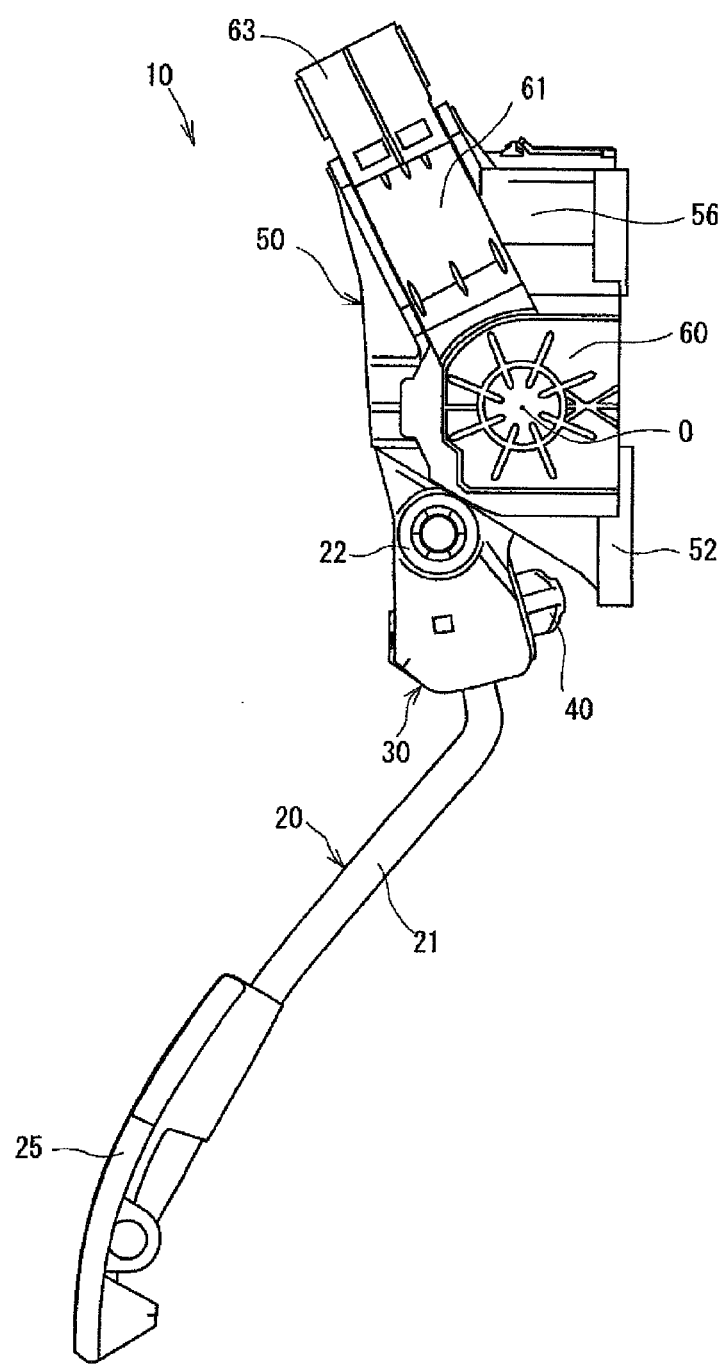
FIG. 3 is a view taken in a direction of an arrow III in FIG. 2.
Figure 4:
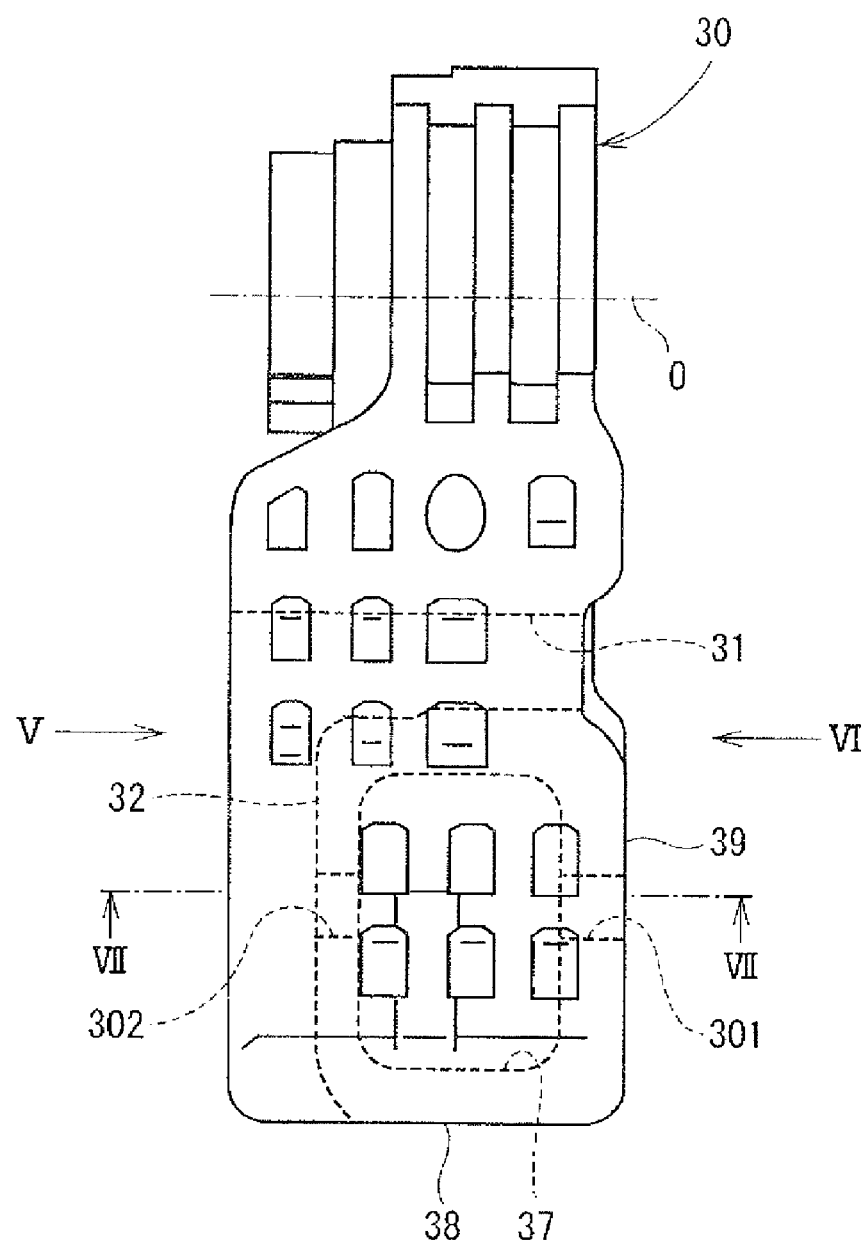
FIG. 4 is a plan view of a rotatable member according to the first embodiment.
Figure 5:
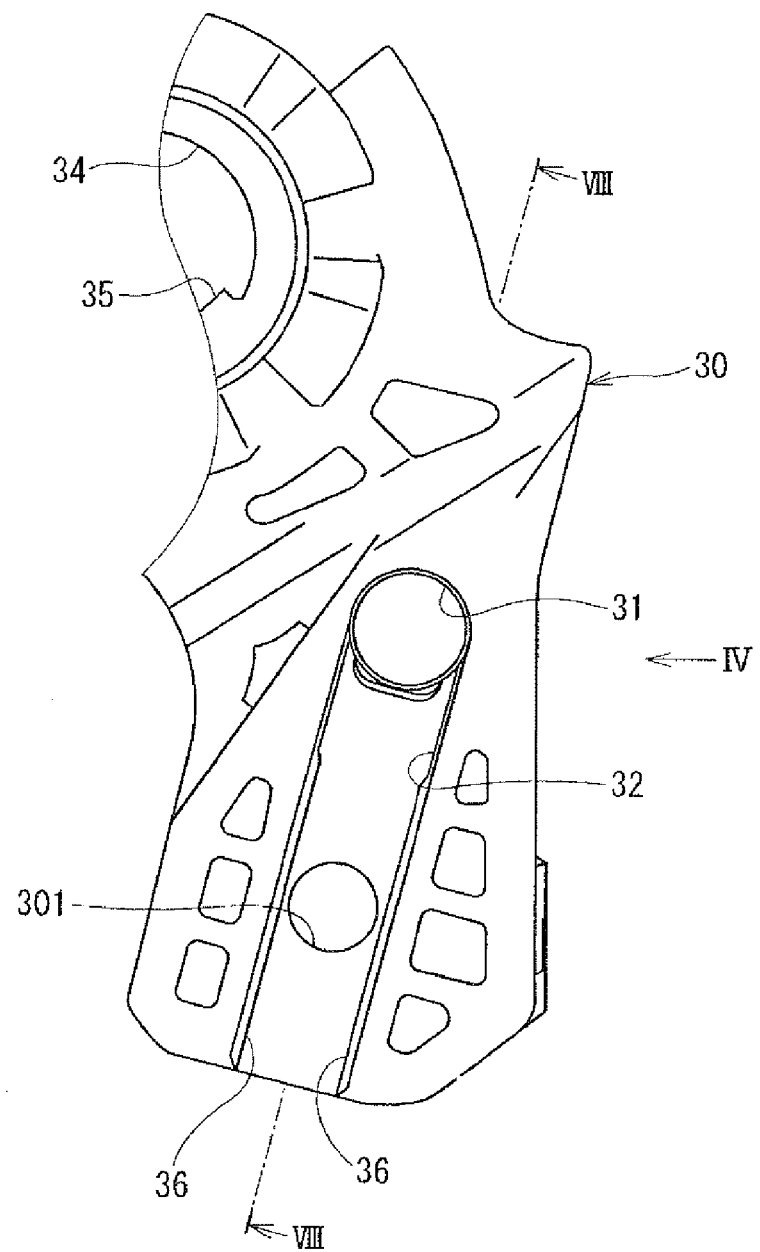
FIG. 5 is a view taken in a direction of an arrow V in FIG. 4.
Figure 6:
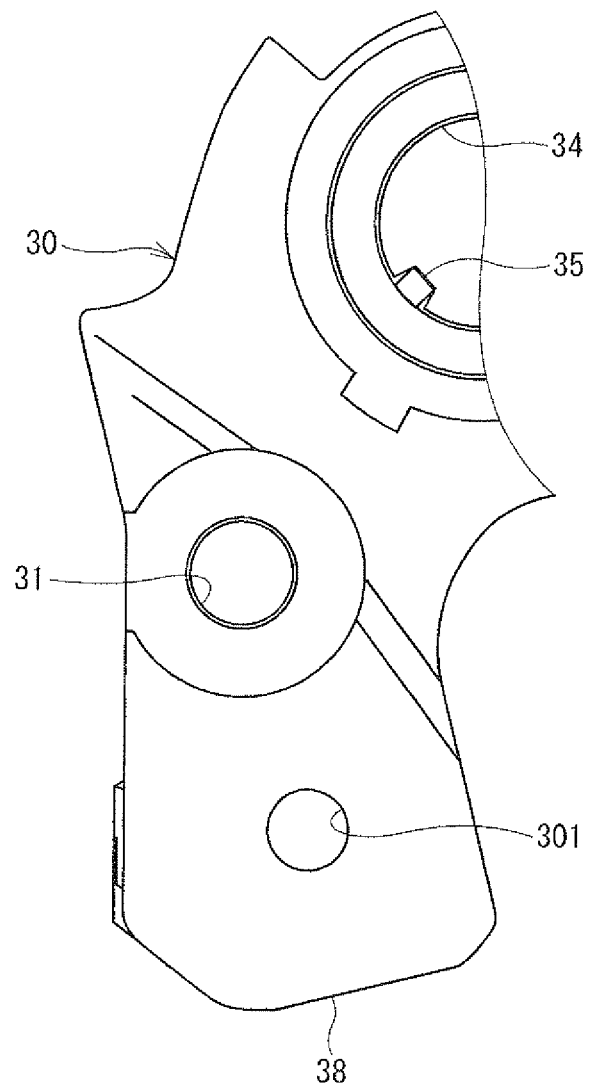
FIG. 6 is a view taken in a direction of an arrow VI in FIG. 4.
Figure 7:
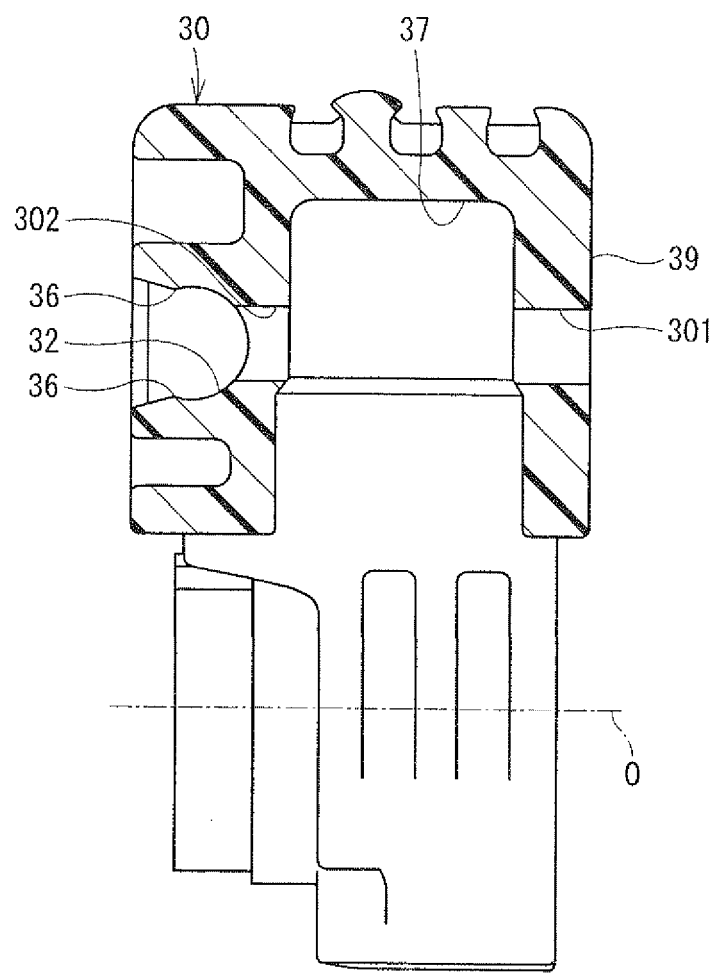
FIG. 7 is a cross sectional view taken along line VII-VII in FIG. 4.
Figure 8:
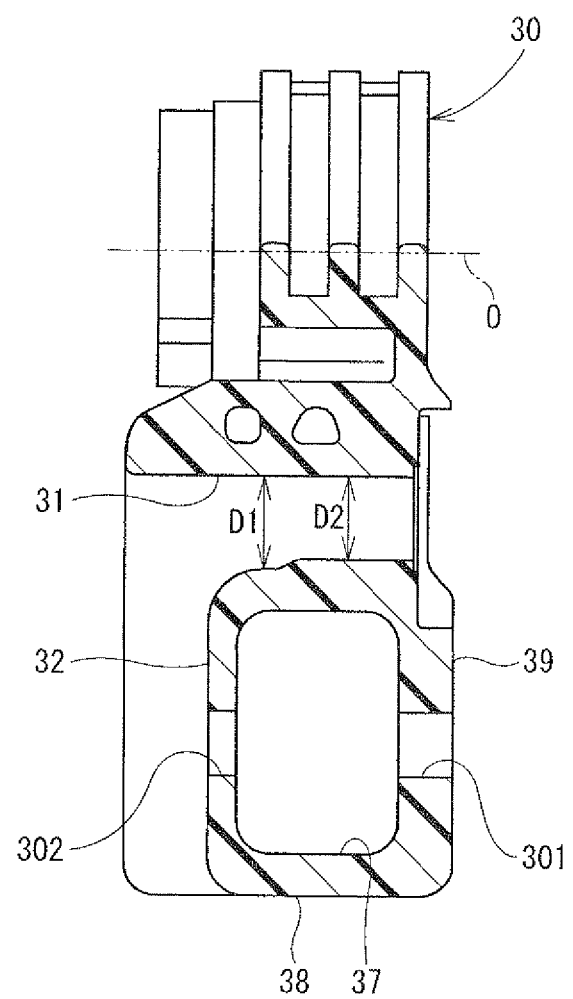
FIG. 8 is a cross sectional view taken along line VIII-VIII in FIG. 5.

With reference to FIGS. 1 to 3, the pedal apparatus 10 includes a support member 50, the rotatable member 30, a pedal rod 20 and a kick-down switch 40.

The support member 50 is configured into a box form and includes a bottom plate 52, a top plate 55 and two side plates 56, 57. The bottom plate 52 and the top plate 55 are opposed to each other, and the side plate 56 and the side plate 57 are placed perpendicular to the bottom plate 52 and the top plate 55 and are opposed to each other. The support member 50 is made of a resin material.

The bottom plate 52 includes three mount holes 54, and three bolts are inserted through the mount holes 54, respectively, to mount the bottom plate 52 to a wall of a body of the vehicle, which is placed at a location where the foot of the driver is placed.

A sensor cover 61 is installed to the side plate 56. A Hall IC (not shown) and a circular disk shaped magnetic body are insert molded in the sensor cover 61 at a location around a rotational axis O. The Hall IC senses a rotational angle of permanent magnets (not shown), which are provided to the rotatable member 30 such that the permanent magnets are opposed to each other about the rotational axis O. A voltage, which is outputted from the Hall IC, is conducted to the ECU through a connector 63, which is provided at a distal end part of the sensor cover 61. A resin cover 60 is installed to an outer side of the sensor cover 61 to protect the Hall IC.

In the support member 50, a support shaft (not shown) is rotatably supported between the side plate 56 and the side plate 57. A resin cover 62, which protects this support shaft, is installed to the side plate 57 of the support member 50.

The rotatable member 30 is made of a resin material. With reference to FIGS. 4 to 8, a center hole 34 extends through the rotatable member 30 and receives the support shaft. A protrusion 35, which radially inwardly protrudes in the center hole 34, is engaged with a recess of the support shaft. In this way, the rotatable member 30 is rotatably supported by the support member 50 such that the rotatable member 30 is rotatable about the rotational axis O.

The rotatable member 30 includes a press-fitting hole 31 and a guide groove 32, into which the pedal rod 20 is installed. The press-fitting hole 31 extends generally parallel to the rotational axis O, and the guide groove 32 of the rotatable member 30 extends generally perpendicular to the rotational axis. A recess 37, to which the kick-down switch 40 is fitted, is formed in a bottom plate 52 side part of the rotatable member 30. The recess 37 opens in a rotational direction of the rotatable member 30, in which the rotatable member 30 is rotated at time of increasing the pedal force applied from the driver to the pad 25.

The press-fitting hole 31 of the rotatable member 30 is configured such that an inner diameter D2 of a distant part (small diameter part) of the press-fitting hole 31, which is distant from the guide groove 32, is smaller than an inner diameter D1 of an adjacent part (large diameter part) of the press-fitting hole 31, which is adjacent to the guide groove 32. The inner diameter D1 is equal to or slightly larger than an outer diameter of a distal end portion 24 of the pedal rod 20, and the inner diameter D2 is slightly smaller than the outer diameter of the distal end portion 24 of the pedal rod 20. In this way, the distal end portion 24 of the pedal rod 20 can be press-fitted into the distant part (small diameter part) of the press-fitting hole 31, which is distant from the guide groove 32 and has the inner diameter D2.

Claws 36 are formed in an inner wall of the guide groove 32 of the rotatable member 30 at an opening side of the guide groove 32. An intermediate portion 23 of the pedal rod 20 can be fitted to the claws 36. An inner diameter (or a depth) of the guide groove 32 of the rotatable member 30 is increased toward the recess 37 at an end portion 38 of the rotatable member 30.

A first receiving hole 301 is formed in the rotatable member 30 to communicate between the recess 37 and an outer wall (outer side wall) 39 of the rotatable member 30, which is located at one side of the rotatable member 30 in a direction of the rotational axis O. Furthermore, a second receiving hole 302 is formed in the rotatable member 30 to communicate between the recess 37 and an inner wall (bottom wall) of the guide groove 32, which is located on a side where the press-fitting hole 31 opens, i.e., at which the press-fitting hole 31 is communicated with the guide groove 32. The first receiving hole 301 and the second receiving hole 302 are generally coaxial with each other and are generally parallel to the rotational axis O. The first receiving hole 301 and the second receiving hole 302 are generally perpendicular to an extending direction (longitudinal direction) of the guide groove 32 and are generally parallel to an extending direction (longitudinal direction) of the press-fitting hole 31.

The first receiving hole 301 and the second receiving hole 302 have a cylindrical shape. However, the shape of the first receiving hole 301 and the shape of the second receiving hole 302 are not limited to the cylindrical shape. That is, the shape of the first receiving hole 301 and the shape of the second receiving hole 302 may be changed to any other suitable shape, such as a conical shape or a polygonal shape having a polygonal cross section. The first receiving hole 301 and the second receiving hole 302 may collectively serve as a receiving hole of the present invention.

With reference to FIGS. 1 to 3, the pedal rod 20 includes the distal end portion 24, the intermediate portion 23 and an elongated portion 21, which are formed integrally from a metal material. The distal end portion 24 is press-fitted into the press-fitting hole 31 of the rotatable member 30. The intermediate portion 23 extends from and is bent relative to the distal end portion 24. The intermediate portion 23 is fitted into, i.e., is received in the guide groove 32 of the rotatable member 30. The elongated portion 21 extends from the intermediate portion 23 in a direction opposite from the distal end portion 24.

The distal end portion 24 extends in a direction generally parallel to the rotational axis O. A washer snap (snap ring) 22 is fitted to a projecting part of the distal end portion 24, which projects from the rotatable member 30.

The intermediate portion 23 is bent relative to the distal end portion 24 generally at a right angle to have an L-shape and extends generally perpendicular to the rotational axis O.

The elongated portion 21 extends from and is bent relative to the intermediate portion 23 toward the recess 37 at a location between the end portion (pad 25 side outer wall) 38 of the rotatable member 30 and the second receiving hole 302.

The pad 25 is made of a resin material and is fitted to an end part of the elongated portion 21 of the pedal rod 20. When the pedal force of the driver applied to the pad 25 is increased, the pad 25 is rotated toward the bottom plate 52 side (the left side in FIG. 1). The pedal force, which is applied to the pad 25, is conducted to the rotatable member 30 through the pedal rod 20. The rotatable member 30 receives a force of a spring (not shown), which is provided in an inside of the support member 50, in a direction, which is opposite from a direction of the pedal force of the driver. In this way, the pad 25 is rotated in a forward direction or a backward direction in response to an increase or decrease of the pedal force of the driver applied to the pad 25.

The kick-down switch 40 is press-fitted into the recess 37, which is formed in the rotatable member 30. The kick-down switch 40 provides a click feeling to the driver through a mechanical structure provided in the kick-down switch 40.

Now, an assembling method of the rotatable member 30 and the pedal rod 20 will be described.

Figure 9:
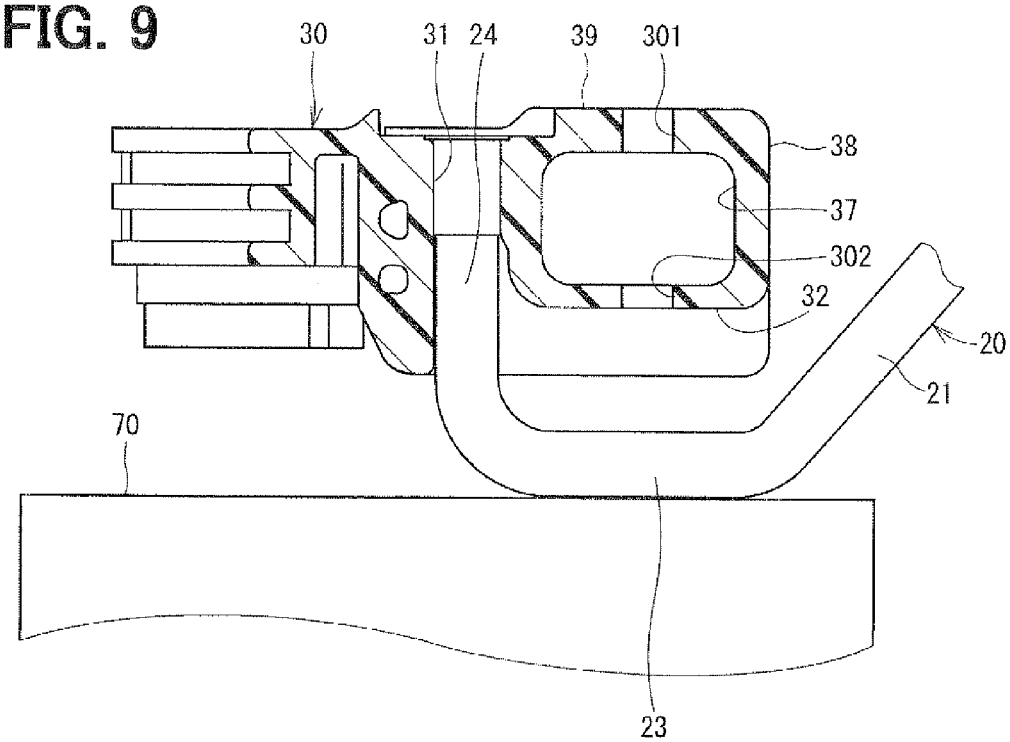
FIG. 9 is a schematic cross-sectional view showing a part of an assembling method of the rotatable member and a pedal rod according to the first embodiment.
Figure 10:
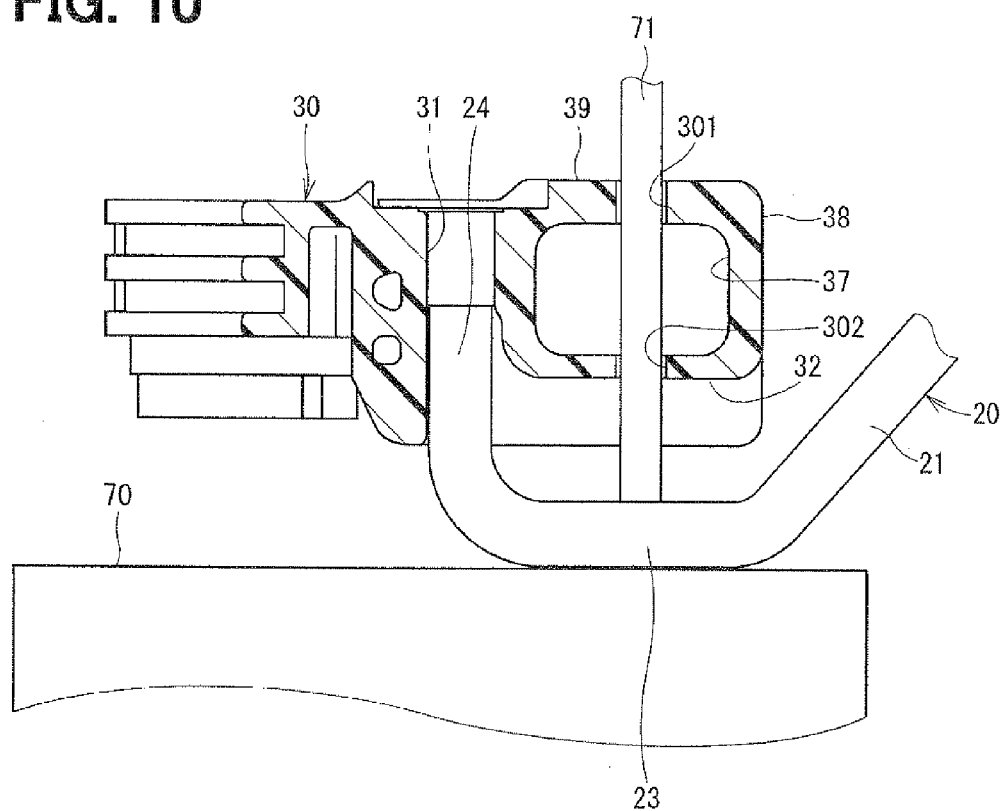
FIG. 10 is a cross-sectional view showing another part of the assembling method of the rotatable member and the pedal rod according to the first embodiment.

First of all, as shown in FIG. 9, the pedal rod 20 is placed on a base (also referred to as a pedestal) 70. Next, the distal end portion 24 of the pedal rod 20 is inserted into the press-fitting hole 31 of the rotatable member 30 to a point where the inner diameter of the press-fitting hole 31 changes (i.e., a boundary between the large diameter part having the diameter D1 and the small diameter part having the diameter D2 in the press-fitting hole 31). Thereafter, as shown in FIG. 10, a jig 71, which is configured into a straight rod, is inserted through the first receiving hole 301 and the second receiving hole 302 of the rotatable member 30. Thereby, the intermediate portion 23 of the pedal rod 20 is supported by the jig 71 and the base 70, i.e., is stationary held between the jig 71 and the base 70.

Figure 11:
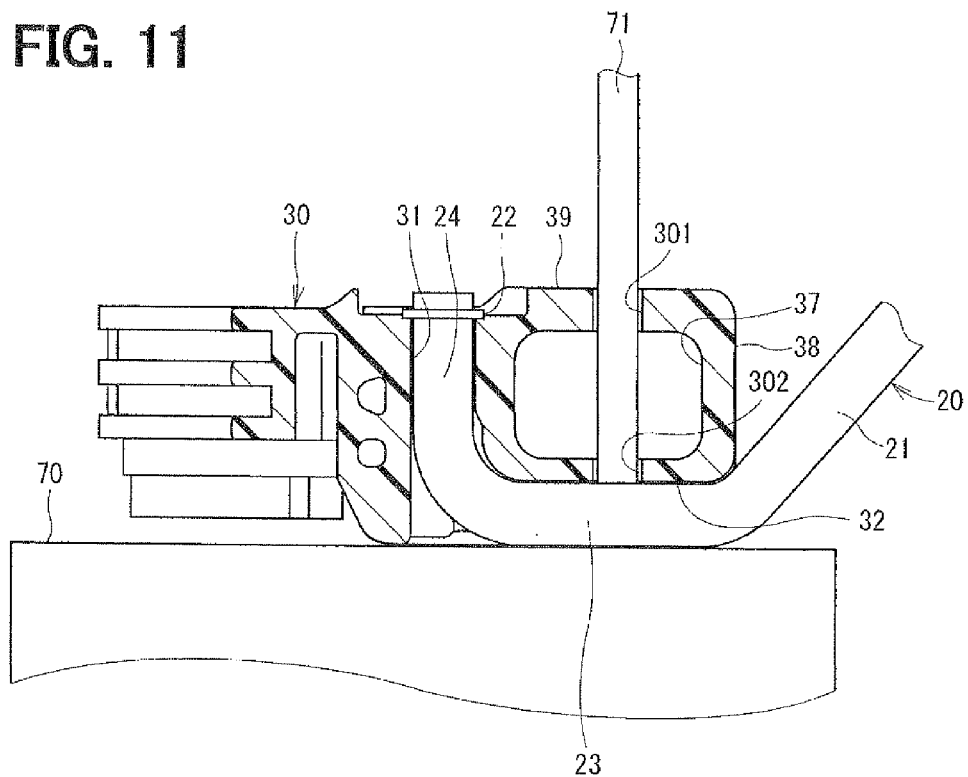
FIG. 11 is a cross-sectional view showing another part of the assembling method of the rotatable member and the pedal rod according to the first embodiment.

Then, as shown in FIG. 11, in the state where the intermediate portion 23 of the pedal rod 20 is supported by the jig 71 and the base 70, the rotatable member 30 is moved toward the base 70. In this way, the distal end portion 24 of the pedal rod 20 is press-fitted into the press-fitting hole 31, and the intermediate portion 23 of the pedal rod 20 is fitted into the guide groove 32.

At this time, a proximal part of the distal end portion 24, which is placed adjacent to the base 70, is spaced from the base 70. Therefore, a tilting force is exerted to the pedal rod 20 to tilt the distal end portion 24 in a direction opposite from the elongated portion 21. However, since the intermediate portion 23 is supported by the jig 71 and the base 70, the tilting of the distal end portion 24 is limited.

Thereafter, the washer snap (snap ring) 22 is engaged to the projecting part of the distal end portion 24, which projects from the rotatable member 30.

Figure 12:
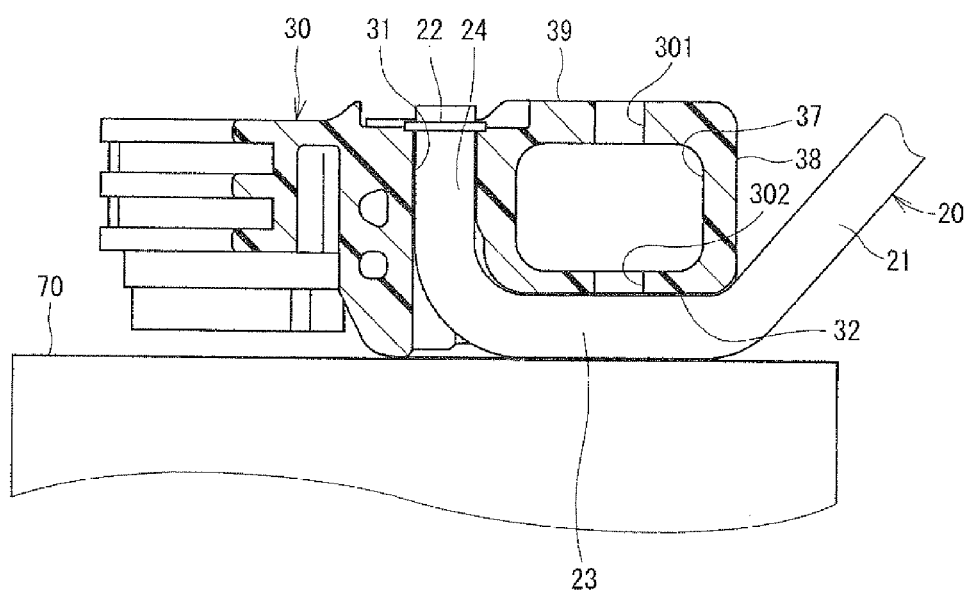
FIG. 12 is a cross-sectional view showing another part of the assembling method of the rotatable member and the pedal rod according to the first embodiment.

Finally, as shown in FIG. 12, the jig 71 is removed from the first receiving hole 301 and the second receiving hole 302, and the assembling of the rotatable member 30 and the pedal rod 20 is completed.

Here, as the first comparative example, the pedal apparatus of Japanese Unexamined Patent Publication No. 2009-166804A shown in FIGS. 20 to 22 will be described.

In the pedal apparatus 100 of the first comparative example, the intermediate portion 230 of the pedal rod 200 extends to the outside of an outer wall 380 of the rotatable member 300.

An assembling method of the rotatable member 300 and the pedal rod 200 of the pedal apparatus 100 of the first comparative example will be described.

Figure 20:
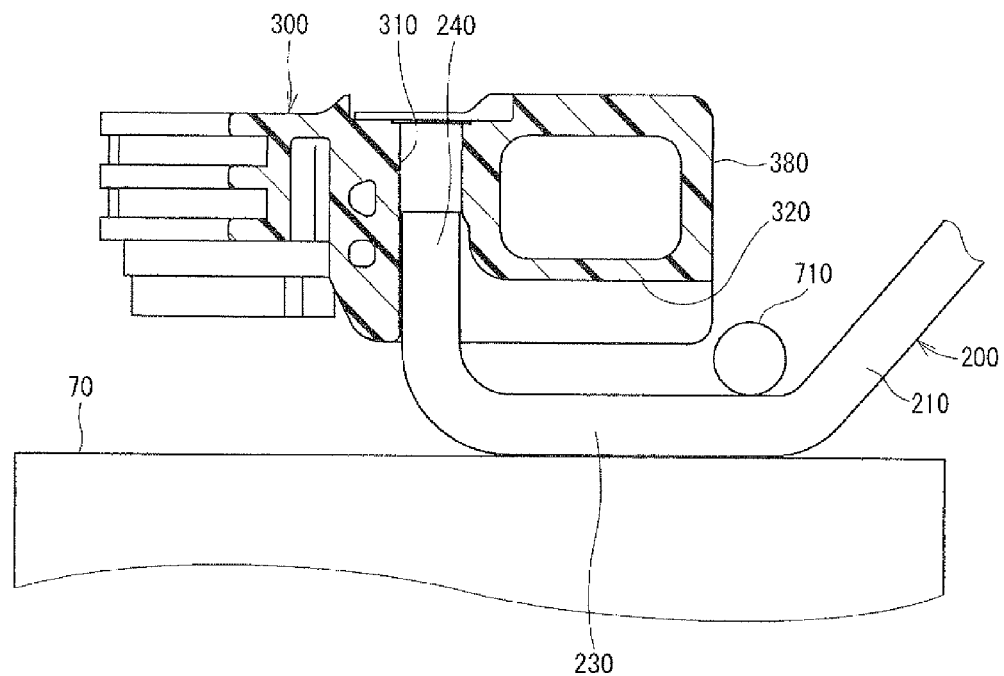
FIG. 20 is a cross-sectional view showing an assembling method of a rotatable member and a pedal rod in a first comparative example.

In the first comparative example, as shown in FIG. 20, a part of the intermediate portion 230, which extends outward from the rotatable member 300, is supported by a jig 710 and a base 70.

Figure 21:
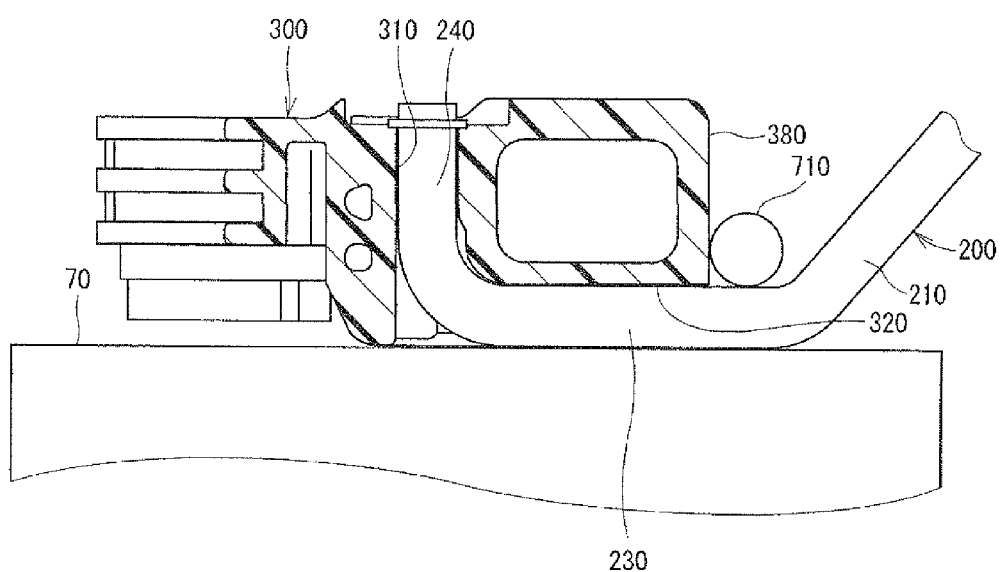
FIG. 21 is a cross-sectional view showing another part of the assembling method of the rotatable member and the pedal rod in the first comparative example.

Next, as shown in FIG. 21, the rotatable member 300 is moved toward the base 70, so that the distal end portion 240 of the pedal rod 200 is press-fitted into the press-fitting hole 310 toward the side opposite from the guide groove 320, and the intermediate portion 230 of the pedal rod 200 is fitted into the guide groove 320.

Figure 22:
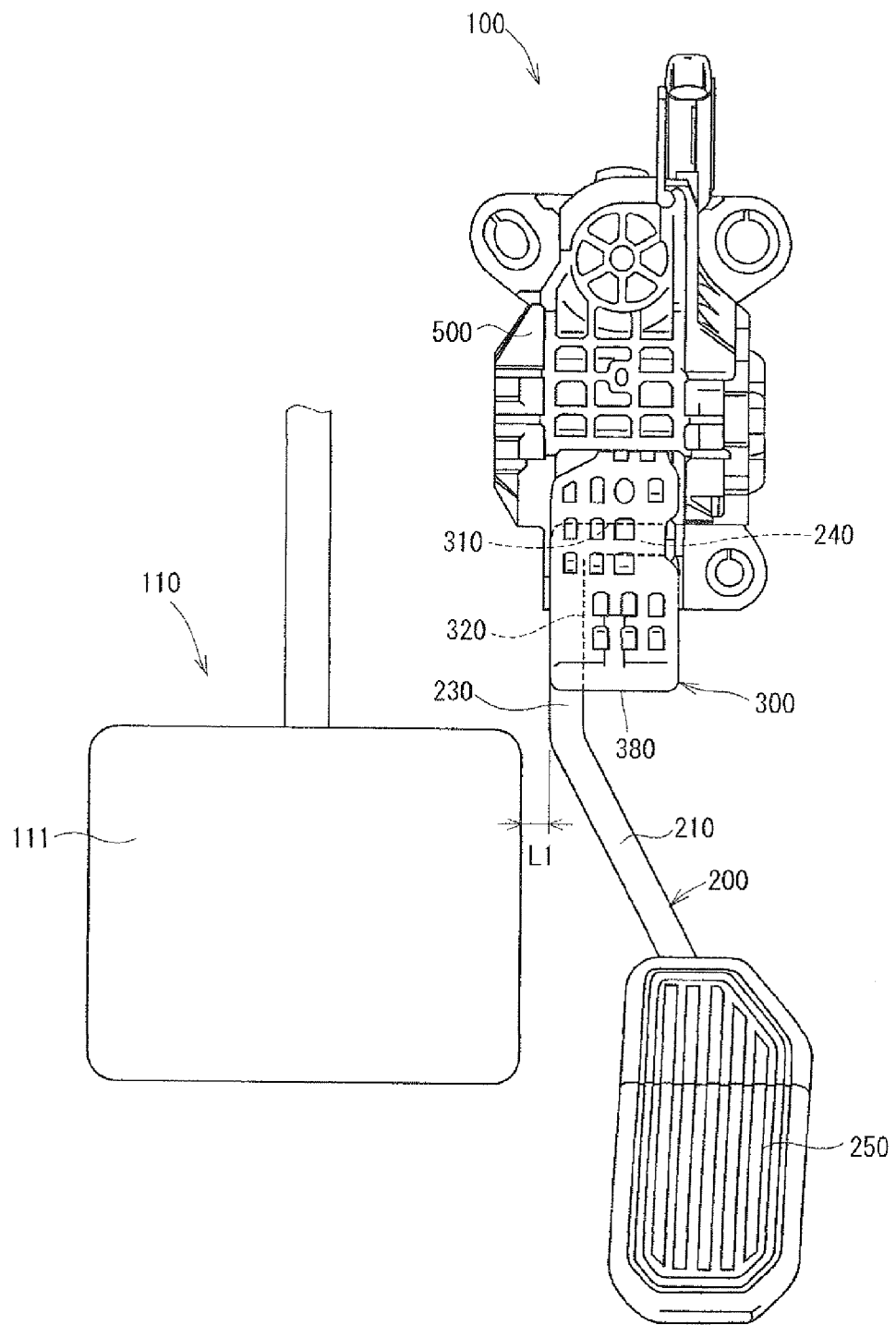
FIG. 22 is a schematic descriptive view showing a state where the pedal apparatus of the first comparative example is installed in the vehicle.
Figure 23:
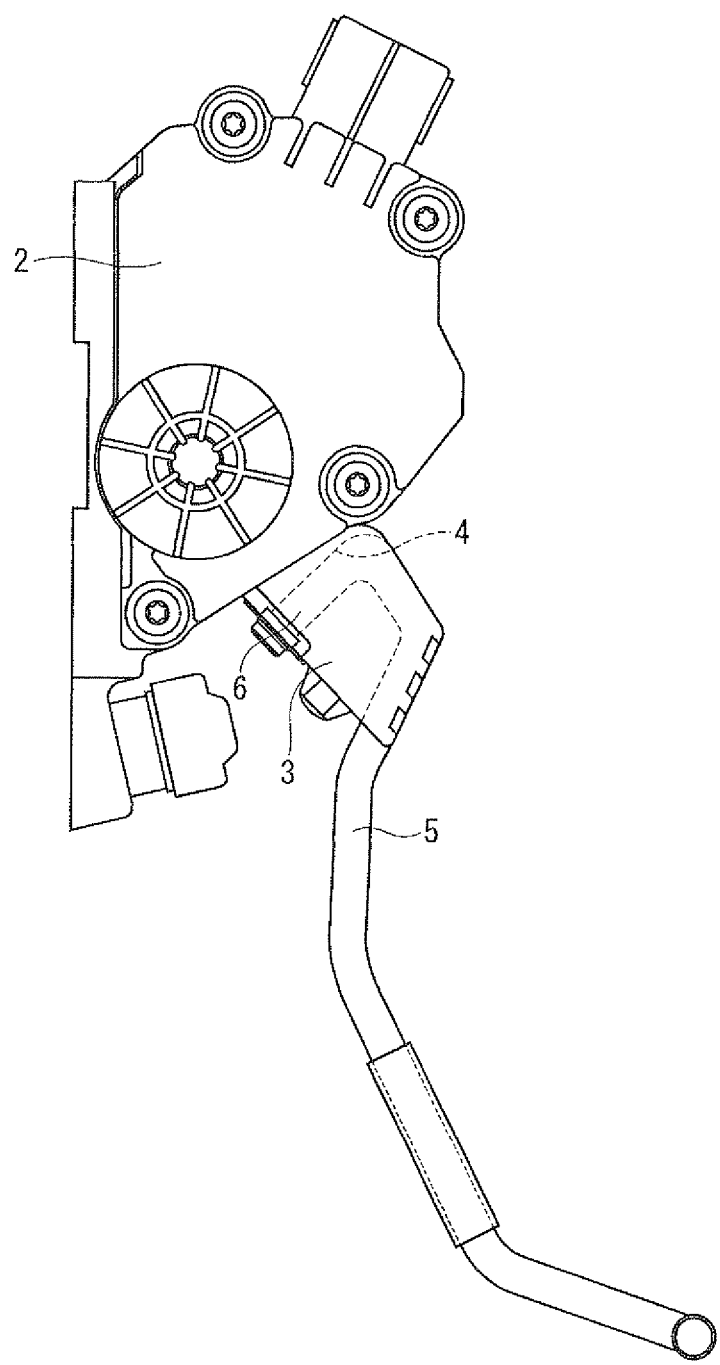
FIG. 23 is a side view showing a pedal apparatus in a second comparative example.

FIG. 22 shows the state where the pedal apparatus 100 of the first comparative example is installed to the vehicle. In the vehicle, the brake pedal apparatus 110 and the pedal apparatus 100 are placed side-by-side. In the first comparative example, the elongated portion 210 is bent relative to the intermediate portion 230 at a location, which is on the pad 250 side of the outer wall 380 of the rotatable member 300. Therefore, the distance L1 between the elongated portion 210 of the pedal apparatus 100 and the pad 111 of the brake pedal apparatus 110 is small.

Figure 13:
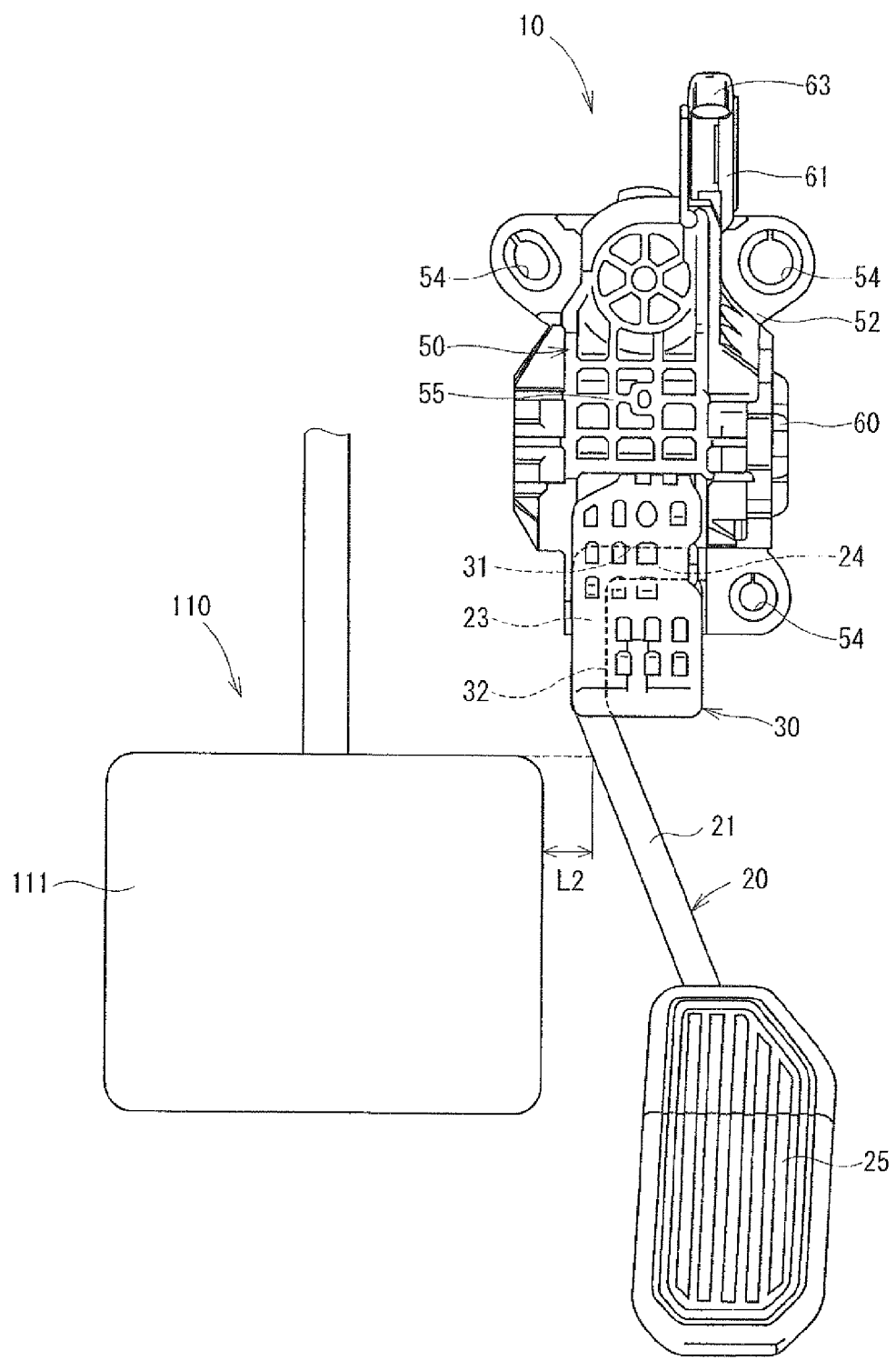
FIG. 13 is a schematic view showing a state where the pedal apparatus of the first embodiment is installed in a vehicle.

In the present embodiment, the first receiving hole 301 and the second receiving hole 302, which extend generally parallel to the press-fitting hole 31 of the rotatable member 30, are provided in the rotatable member 30. In this way, at the time of assembling the rotatable member 30 and the pedal rod 20 together, it is possible to insert the jig 71 into the first receiving hole 301 and the second receiving hole 302 and to support the intermediate portion 23 at the inside of the rotatable member 30. Thereby, a degree of design freedom of the pedal rod 20 is improved. Furthermore, in the pedal rod 20, the elongated portion 21 is bent relative to the intermediate portion 23 at the inside of the rotatable member 30 (i.e., at the location within the extent of the rotatable member 30) toward the recess 37. Therefore, as shown in FIG. 13, in the pedal apparatus 10 of the present embodiment, it is possible to increase a distance L2 between the elongated portion 21 of the pedal apparatus 10 and the pad 111 of the brake pedal apparatus 110. Therefore, when the driver depresses the pad 111 of the brake pedal apparatus 110 with his foot, it possible to limit or minimize the occurrence of the contact of the foot of the driver to the pedal rod 20 of the pedal apparatus 10 to avoid the interference.

Second Embodiment

A pedal apparatus according to a second embodiment of the present invention will be described with reference to FIGS. 14 to 18.

In the following embodiments, the components, which are similar to those of the first embodiment, will be indicated by the same reference numerals and will not be described again to avoid redundancy.

In the present embodiment, the first receiving hole of the first embodiment is eliminated. Therefore, only the second receiving hole 302 is formed in the rotatable member 30 to communicate between the recess 37 and the inner wall (bottom wall) of the guide groove 32, which is located on the side where the press-fitting hole 31 opens, i.e., where the press-fitting hole 31 of the rotatable member 30 is communicated with the guide groove 32. The second receiving hole 302 alone may serve as the receiving hole of the present invention.

Now, an assembling method of the rotatable member 30 and the pedal rod 20 of the present embodiment will be described.

Figure 14:
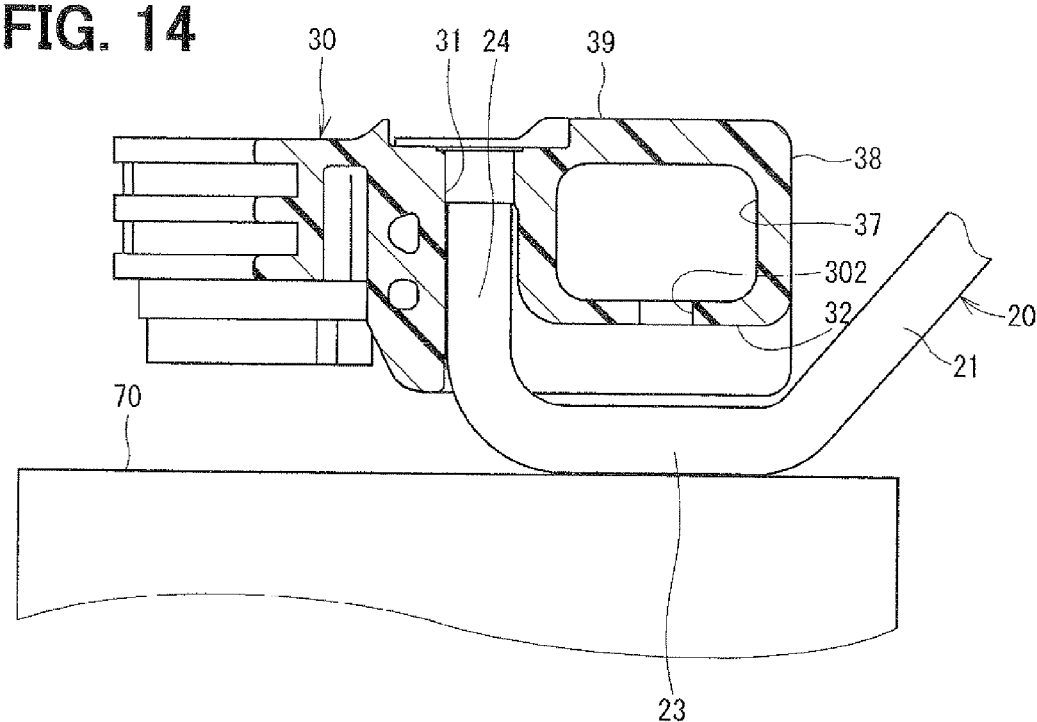
FIG. 14 is a cross-sectional view showing a part of an assembling method of a rotatable member and a pedal rod according to a second embodiment of the present invention.

First of all, as shown in FIG. 14, the pedal rod 20 is placed on the base 70, and the distal end portion 24 of the pedal rod 20 is inserted into the press-fitting hole 31 to the point where the inner diameter of the press-fitting hole 31 changes (i.e., the boundary between the large diameter part having the diameter D1 and the small diameter part having the diameter D2 in the press-fitting hole 31 described in the first embodiment).

Figure 15:
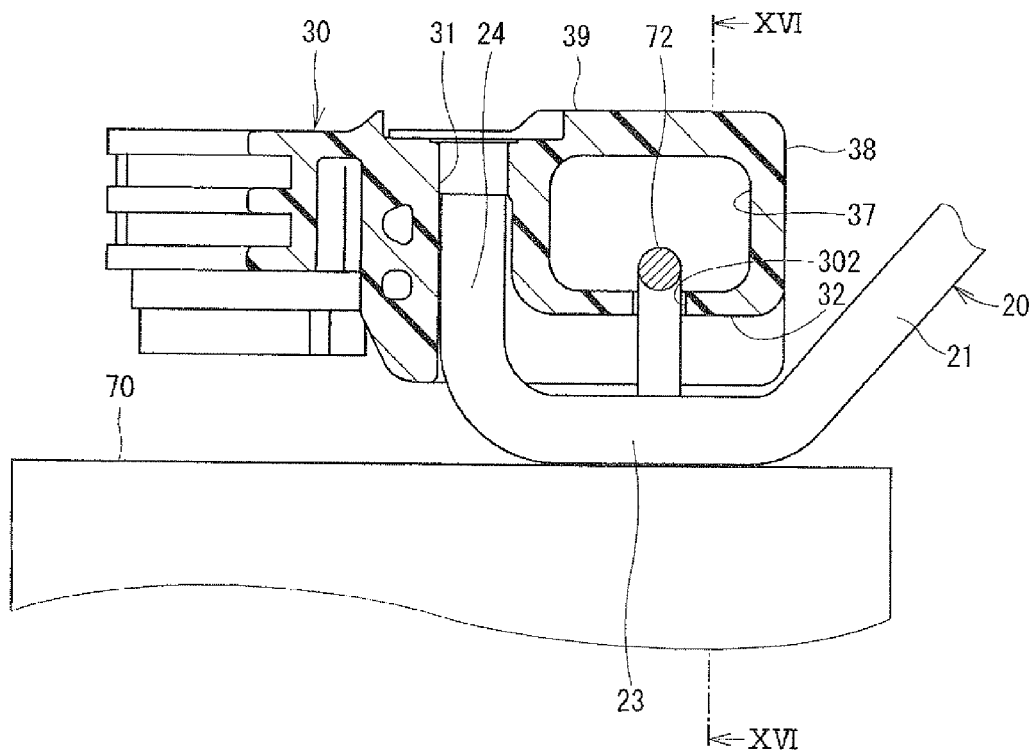
FIG. 15 is a cross-sectional view showing another part of the assembling method of the rotatable member and the pedal rod according to the second embodiment.
Figure 16:
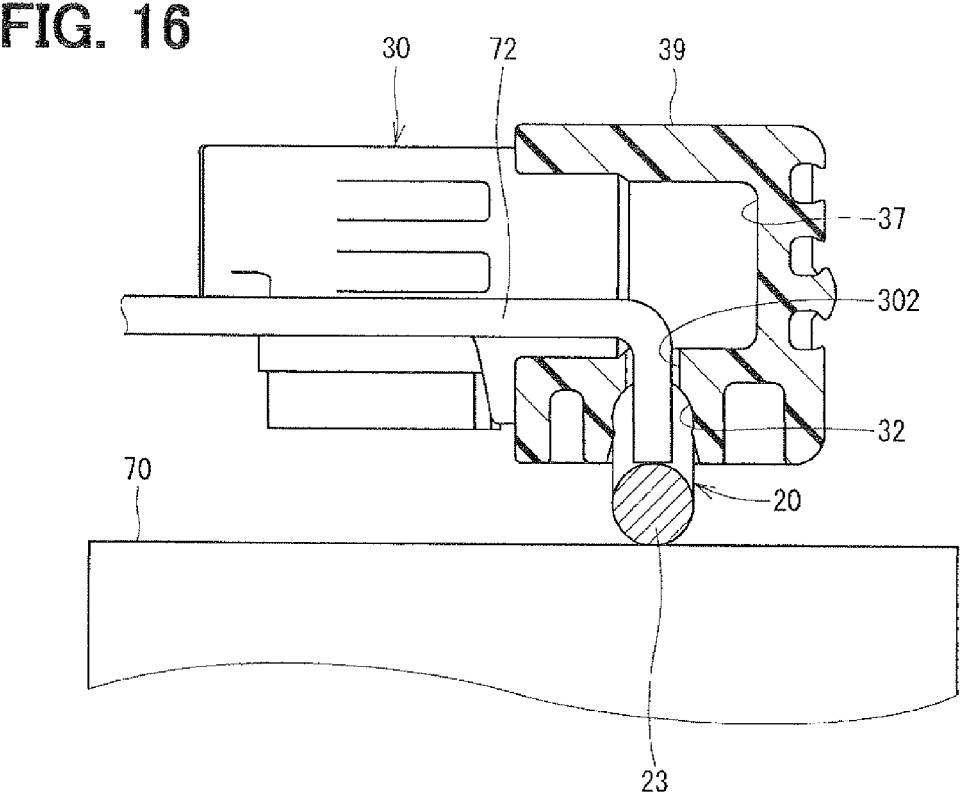
FIG. 16 is a cross sectional view taken along line XVI-XVI in FIG. 15.

Next, as shown in FIGS. 15 and 16, a jig 72, which is configured into an L-shaped rod, is inserted into the second receiving hole 302 of the rotatable member 30 from the opening side of the recess 37, so that the intermediate portion 23 of the pedal rod 20 is supported by the jig 72 and the base 70, i.e., is stationary held between the jig 72 and the base 70.

Figure 17:
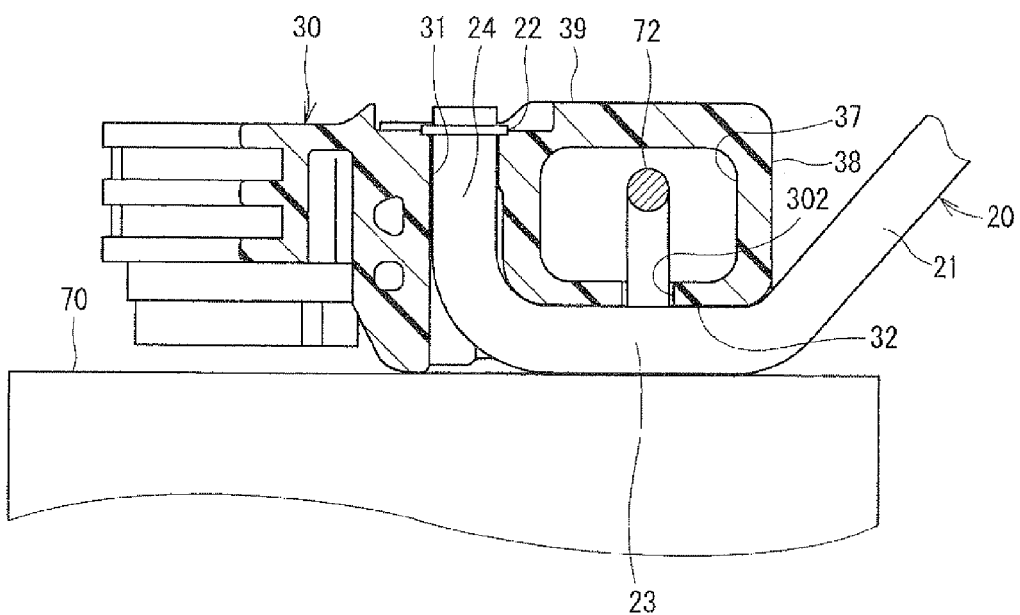
FIG. 17 is a cross-sectional view showing another part of the assembling method of the rotatable member and the pedal rod according to the second embodiment.

Then, as shown in FIG. 17, in the state where the intermediate portion 23 of the pedal rod 20 is supported by the jig 72 and the base 70, the rotatable member 30 is moved toward the base 70. In this way, the distal end portion 24 of the pedal rod 20 is press-fitted into the press-fitting hole 31 toward the side opposite from the guide groove 32, and the intermediate portion 23 of the pedal rod 20 is fitted into the guide groove 32. Then, the washer snap (snap ring) 22 is engaged to the projecting part of the distal end portion 24, which projects from the rotatable member 30.

Figure 18:
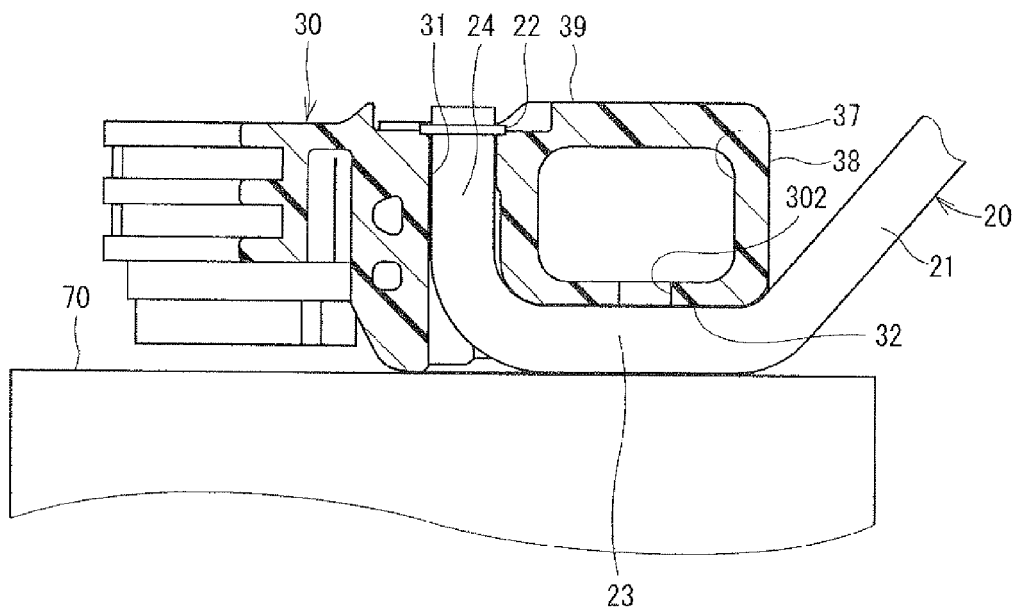
FIG. 18 is a cross-sectional view showing another part of the assembling method of the rotatable member and the pedal rod according to the second embodiment.

Finally, as shown in FIG. 18, the jig 72 is removed from the opening of the recess 37. Thereafter, the kick-down switch 40 is press-fitted into the recess 37.

In the present embodiment, only the second receiving hole 302 is provided in the rotatable member 30 without providing the first receiving hole in the rotatable member 30. Therefore, it is possible to improve the rigidity of the rotatable member 30. Furthermore, it is possible to reduce the manufacturing costs for forming the receiving hole.

In addition, according to the present embodiment, when the pedal apparatus is installed to the vehicle, the second receiving hole 302 is out of sight of the driver. That is, the second receiving hole 302 is not visible to the driver.

Third Embodiment

Figure 19:
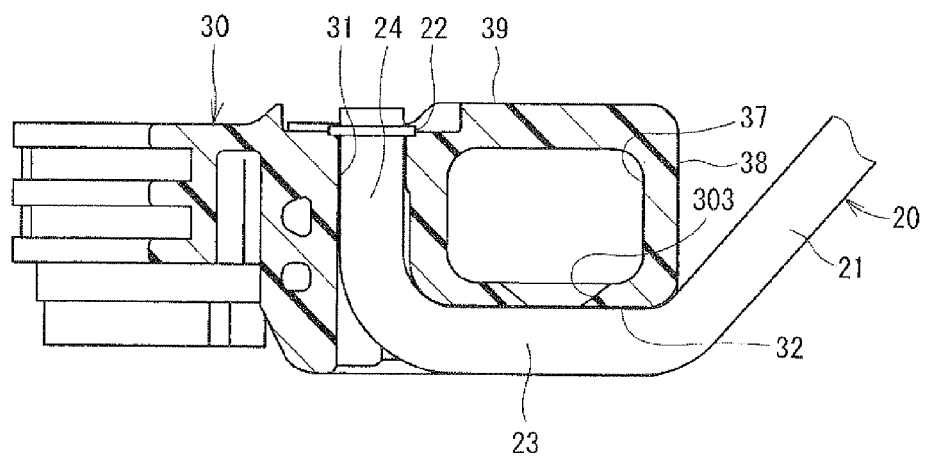
FIG. 19 is a cross-sectional view showing a rotatable member and a pedal rod according to a third embodiment of the present invention.

FIG. 19 shows a pedal apparatus according to a third embodiment of the present invention.

In the present embodiment, the second receiving hole 303 of the rotatable member 30 is tapered such that an inner diameter of a part of the second receiving hole 303, which is adjacent to the recess 37, is larger than an inner diameter of another part of the second receiving hole 303, which is adjacent to the guide groove 32. In other words, the inner diameter of the second receiving hole 303 decreases from the recess 37 side toward the guide groove 32 side. In this way, at the time of assembling the rotatable member 30 and the pedal rod 20 together, the jig 72 can be easily inserted into the second receiving hole 303.

Now, modifications of the above embodiments will be described.

In the above embodiments, the press-fitting hole 31 of the rotatable member 30 extends generally parallel to the rotational axis O, and the guide groove 32 of the rotatable member 30 extends generally perpendicular to the press-fitting hole 31. Alternatively, the press-fitting hole of the rotatable member may be modified to extend generally perpendicular to the rotational axis O, and the guide groove of the rotatable member may be modified to extend at an acute angle or an obtuse angle relative to the press-fitting hole. Even in such a case, the receiving hole of the rotatable member extends generally perpendicular to the guide groove and opens in the inner wall (bottom wall) of the guide groove, which is located on the side where the press-fitting hole opens. In this way, the pedal rod can be supported by the base and the jig at the inside of the rotatable member.

In the above embodiments, the pedal rod 20 is placed on the base 70, and the rotatable member 30 is moved toward the base 70. Alternatively, the rotatable member may be placed on the base such that the guide groove of the rotatable member is directed upward. Then, the pedal rod is moved from the top side of the rotatable member toward the base, so that the distal end portion of the pedal rod is press-fitted into the press-fitting hole. In such a case, the jig is moved toward the pedal rod in the state where the intermediate portion of the pedal rod is supported.

Furthermore, it is not necessary to use the base to place the pedal rod or the rotatable member thereon. That is, as long as the pedal rod or the rotatable member can be fixed thereon, it is possible to use any other suitable device besides the base.

As discussed above, the present invention is not limited the above embodiments and modifications thereof. That is, the above embodiments and modifications thereof may be modified in various ways without departing from the sprit and scope of the invention.

What is claimed is:
1. A pedal apparatus for a vehicle, comprising:
   a support member that is adapted to be installed to the vehicle;
   a rotatable member that is rotatably supported by the support member;
   a pedal rod that includes:

a distal end portion that is press-fitted into a press-fitting hole, which is formed in the rotatable member;

an intermediate portion that extends from and is bent relative to the distal end portion, wherein the intermediate portion is received in a guide groove, which is formed in the rotatable member; and an elongated portion that extends from the intermediate portion in a direction opposite from the distal end portion; and a pad that is provided to an end part of the elongated portion, which is opposite from the intermediate portion, and is adapted to receive a pedal force from a driver of the vehicle, wherein the rotatable member includes a receiving hole that is adapted to receive a jig therethrough to enable the jig to contact the intermediate portion at time of press-fitting the distal end portion into the press-fitting hole; and the receiving hole of the rotatable member extends generally perpendicular to an extending direction of the guide groove and opens in an inner wall of the guide groove, which is located on a side where the press-fitting hole of the rotatable member is communicated with the guide groove.

2. The pedal apparatus according to claim 1, wherein the elongated portion of the pedal rod is bent relative to the intermediate portion at a location between a pad side outer wall of the rotatable member and the receiving hole.

3. The pedal apparatus according to claim 1, wherein:

the rotatable member includes a recess that opens in a rotational direction of the rotatable member, in which the rotatable member is rotated at time of increasing the pedal force applied from the driver to the pad; and the receiving hole of the rotatable member communicates between the recess and the inner wall of the guide groove, which is located on the side where the press-fitting hole is communicated with the guide groove.

4. The pedal apparatus according to claim 3, wherein the receiving hole of the rotatable member is tapered such that an inner diameter of a part of the receiving hole, which is adjacent to the recess, is larger than an inner diameter of another part of the receiving hole, which is adjacent to the guide groove.

5. A manufacturing method of the pedal apparatus of claim 1, comprising:

placing the pedal rod on a base;

inserting the jig through the receiving hole of the rotatable member such that the intermediate portion of the pedal rod is supported by the jig and the base; and press-fitting the distal end portion of the pedal rod into the press-fitting hole of the rotatable member in a state where the intermediate portion is supported by the jig and the base.

* * * * *